(12) United States Patent
Yeh et al.

(10) Patent No.: US 9,897,271 B2
(45) Date of Patent: Feb. 20, 2018

(54) WALL-MOUNTED SUN TRACKING AND LIGHT GUIDING APPARATUS

(71) Applicant: INSTITUTE OF NUCLEAR ENERGY RESEARCH, ATOMIC ENERGY COUNCIL, EXECUTIVE YUAN, R.O.C., Taoyuan (TW)

(72) Inventors: Hong-Yih Yeh, Taoyuan (TW); Kuo-Chun Hsu, Taoyuan (TW); Jia-Rong Bi, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 15 days.

(21) Appl. No.: 15/254,143

(22) Filed: Sep. 1, 2016

(65) Prior Publication Data

US 2017/0108189 A1    Apr. 20, 2017

(30) Foreign Application Priority Data

Oct. 20, 2015  (TW) .............................. 104134446 A

(51) Int. Cl.
| | |
|---|---|
| F21S 11/00 | (2006.01) |
| F21V 8/00 | (2006.01) |
| G01S 3/786 | (2006.01) |
| G02B 19/00 | (2006.01) |
| F21S 19/00 | (2006.01) |
| F21Y 115/10 | (2016.01) |

(52) U.S. Cl.
CPC ........... *F21S 11/005* (2013.01); *F21S 19/005* (2013.01); *G01S 3/7861* (2013.01); *G02B 6/0008* (2013.01); *G02B 19/0042* (2013.01); *F21Y 2115/10* (2016.08)

(58) Field of Classification Search
CPC ......... F21S 8/03; F21S 11/005; G01S 3/7861; F21J 2/38
USPC ................ 250/203.4; 126/573, 578; 136/246
See application file for complete search history.

(56) References Cited

U.S. PATENT DOCUMENTS

| | | | |
|---|---|---|---|
| 2010/0275903 A1* | 11/2010 | Yeh ............................ | F24J 2/38 |
| | | | 126/578 |
| 2017/0108573 A1* | 4/2017 | Huang .................. | G01S 3/7861 |

* cited by examiner

*Primary Examiner* — Kevin Pyo
(74) *Attorney, Agent, or Firm* — Rosenberg, Klein & Lee

(57) ABSTRACT

The present invention relates to a flat wall-mounted sun-tracking and light-guiding device with built-in sensors, which comprises a sun-tracking and light-guiding member, a sun-tracking controller, a light concentrator, and a switchable light emitter. The sun-tracking and light-guiding member owns the function of tracking the sun and is coupled to the sun-tracking controller. The light concentrator faces the sun and is used for concentrating the sunlight. In addition, the light concentrator is connected with the sun-tracking and light-guiding member. The light concentrator includes a light-guiding optical fiber, which is used for guiding the concentrated sunlight. Besides, the switchable light emitter is connected with one end of the light-guiding optical fiber. The switchable light emitter can be disposed indoors or on plant chambers for lighting the interior or plants using the sunlight guided by the light-guiding optical fiber.

10 Claims, 5 Drawing Sheets

WALL-MOUNTED SUN TRACKING AND LIGHT GUIDING APPARATUS

FIELD OF THE INVENTION

The present invention relates generally to a sun-tracking and light-guiding device, and particularly to a flat wall-mounted sun-tracking and light-guiding device with built-in sensors.

BACKGROUND OF THE INVENTION

As the world pays much attention to the greenhouse effect and energy crisis, how to utilize available energy more efficiently has become the subject of high interest worldwide. Almost all institutions, schools, factories, offices, and residences start to comply with the policies of governments for saving energy consumption and carbon emission. Thereby, the related power-saving lighting and solar lighting equipment are developed rapidly.

Solar lighting systems are applied to indoor or plant chamber lighting. It owns the characteristics of almost consuming no power and uniform spectrum. Thereby, it can solve the problems of LED lamps or T5 lamps in power consumption and nonuniform spectrum.

Traditional solar lighting can be classified into four types: 1. Introducing directly the sunlight using windows; 2. Reflecting and guiding the sunlight to indoor or plant chamber lighting using guiding pipes; 3. Using solar cells for power generation and using lamps for lighting; and 4. Using solar concentrators and light-guiding optical fibers to guide the sunlight to indoor or plant chamber lighting. Among the above methods, the drawback of introducing directly the sunlight using windows is that the sunlight cannot reach the plant chambers or locations indoors and away from the windows. The drawbacks of reflecting and guiding the sunlight to indoor or plant chamber lighting using guiding pipes are that the volume of the pipes is huge and the connection and installation of the pipes indoors or with the plant chambers are inconvenient. The drawback of using solar cells for power generation and using lamps for lighting is that low efficiency due to multiple conversions, including optical to electrical and electrical to optical conversions. Regarding to using solar concentrators and light-guiding optical fibers to guide the sunlight to indoor or plant chamber lighting, because the solar tracking and light guiding device is set on the ground, the length of the light-guiding optical fiber to the interior will be excessively long, which leads to high cost in the light-guiding optical fibers and hence retarding commercialization and promotion.

The Taiwan Patent Publication Number 1405928 discloses an illumination system guided by a light fiber through solar beams. This invention is composed of a focusing beams unit, a sun-tracking controller, a biaxial tracking mechanism, an energy transferring and storing unit, and a light fiber. At first, the sun-tracking controller scans solar beams and let the biaxial tracking mechanism track solar beams. Then, the focusing beams unit can guide light to the room by using the light fiber. Hence, the energy transferring and storing unit can generate power for system applications. Nonetheless, according to the invention, the focusing beams unit collects light reflectively. Consequently, when some incident light enters the radar-type reflection surface, it cannot be reflected into the light collection range, resulting in loss in light. The sun-tracking controller is an optoelectronic solar-location sensor. It might encounter the problems of failure or inaccuracy, leading to failure in tracking the sun. The angle of elevation of the biaxial tracking mechanism is disadvantageous to miniaturized and wall-mounted designs. Besides, the energy transferring the storing unit benefits little the solar lighting system at the expense of increasing the complexity.

Accordingly, it is required to provide a high-performance sunlight-guiding device to indoor or plant chambers and replace the traditional sunlight-guiding lighting system using optical fibers.

SUMMARY

An objective of the present invention is to provide a flat wall-mounted sun-tracking and light-guiding device with built-in sensors. The structure adopts distributed sun location sensors. By using a plurality of photosensors at four positions and detecting the light intensities at the four positions, the location of the sun can be determined. Thereby, the driving mechanisms at different positions are driven to aim the light concentrator at the sun.

Another objective of the present invention is to provide a flat wall-mounted sun-tracking and light-guiding device with built-in sensors, which includes a switchable light emitter. Thereby, the sunlight to be used when the sunlight is available. If not, artificial light will be selected automatically for maintaining the stability of indoor lighting.

A further objective of the present invention is to provide a flat wall-mounted sun-tracking and light-guiding device with built-in sensors, which uses the sunlight directly for lighting. In addition to the advantages of saving power and full-spectrum lighting in indoor or plant chamber applications, the lighting is beneficial to users' eyes, because the spectrum of the visible part of the sunlight is continuous.

In order to achieve the above objectives, the present invention discloses a flat wall-mounted sun-tracking and light-guiding device with built-in sensors, which comprises a sun-tracking controller, a sun-tracking and light-guiding member, a light concentrator, and a switchable light emitter. The sun-tracking and light-guiding member is coupled to the sun-tracking controller, and includes an east-west driving mechanism and a south-north driving mechanism. The east-west driving mechanism is disposed on a base; the south-north driving mechanism is disposed on the east-west driving mechanism. The sun-tracking controller controls the driving of the east-west driving mechanism and the south-north driving mechanism. The light concentrator is connected with the south-north driving mechanism, and includes a light-guiding optical fiber and a plurality of light-sensing optical fibers. The switchable light emitter includes a light-emitting plate and a plurality of photosensors. The light-emitting plate is connected with one end of the light-guiding optical fiber. The plurality of photosensors are connected with one end of the plurality of light-sensing optical fibers, respectively.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
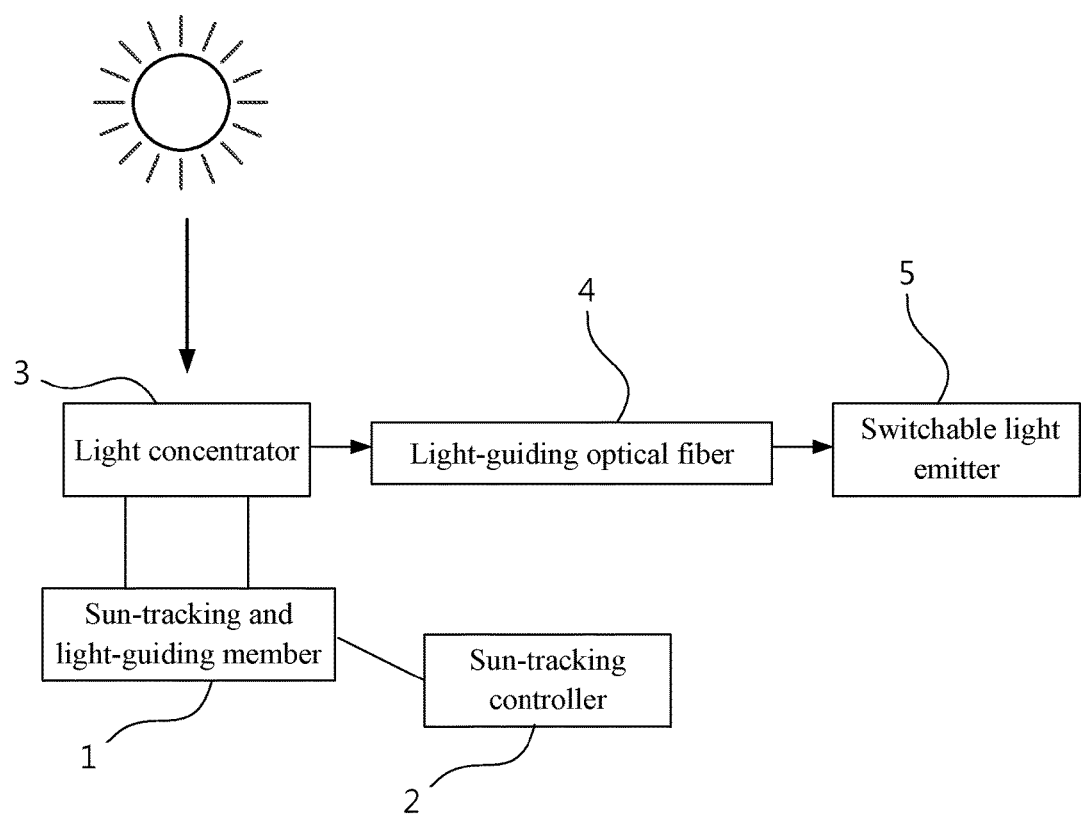
FIG. 1 shows a schematic diagram of the components of the structure according to a preferred embodiment of the present invention.

The present invention discloses a flat wall-mounted sun-tracking and light-guiding device with built-in sensors. Please refer to FIG. 1. The structure comprises a sun-tracking and light-guiding member 1, a sun-tracking controller 2, a light concentrator 3, and a switchable light emitter 5. The sun-tracking and light-guiding member 1 owns the function of tracking the sun and is coupled to the sun-tracking controller 2. The light concentrator 3 faces the sun and is used for concentrating the sunlight. In addition, the light concentrator 3 is connected with the sun-tracking and light-guiding member 1. The light concentrator 3 includes a light-guiding optical fiber 4, which is used for guiding the concentrated sunlight. Besides, the switchable light emitter 5 is connected with one end of the light-guiding optical fiber 4. According to the present invention, the switchable light emitter 5 is disposed indoors or on plant chambers for lighting the interior or plants using the sunlight guided by the light-guiding optical fiber 4.

Figure 2:
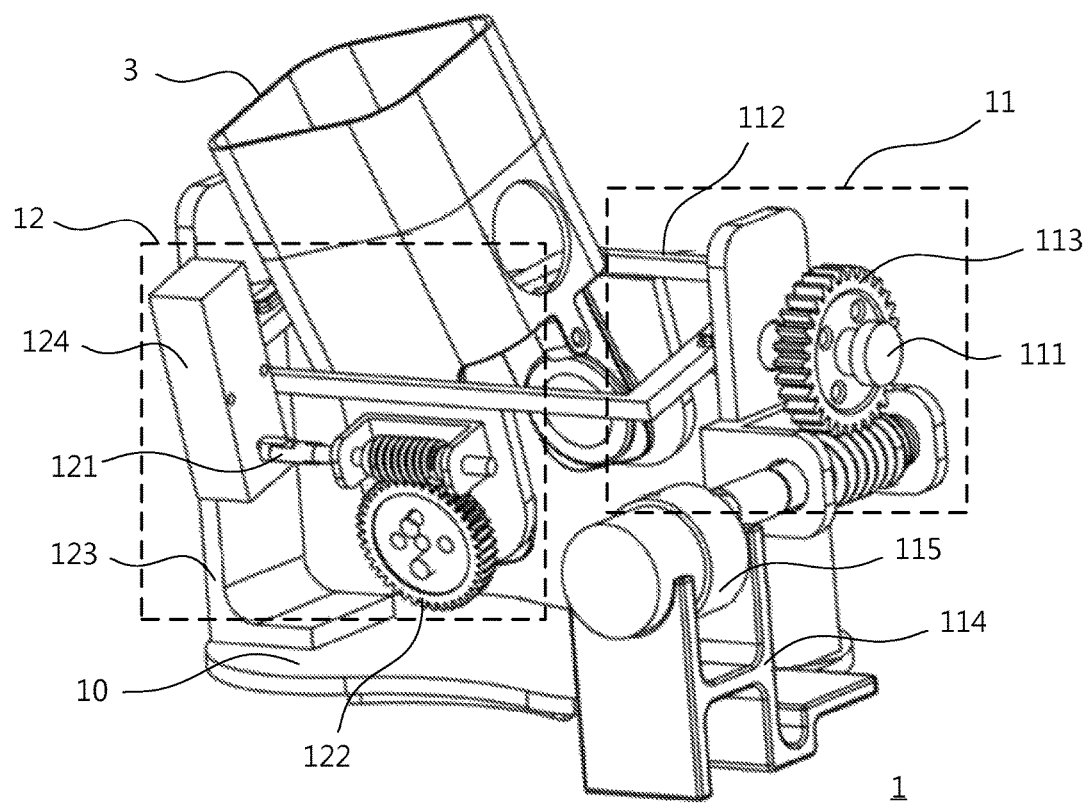
FIG. 2 shows a structural schematic diagram of the sun-tracking and light-guiding member according to a preferred embodiment of the present invention.

Please refer to FIG. 2, which shows a structural schematic diagram of the sun-tracking and light-guiding member according to a preferred embodiment of the present invention. As shown in the figure, the sun-tracking and light-guiding member 1 includes an east-west driving mechanism 11 and a south-north driving mechanism 12, which form a biaxial driving mechanism. The sun-tracking and light-guiding member 1 includes a base 10, which is used as the support. The east-west driving mechanism 11 is disposed on both sides of the base 10. Two or more east-west driving rods 111 and an east-west driving-mechanism platform 112 pass through the east-west driving mechanism 11. The two east-west driving rods 111 are connected correspondingly between the east-west driving mechanism 11 and the east-west driving-mechanism platform 112. One of the east-west driving rods 111 is combined and moved linkedly with an east-west gear 113. In addition, an east-west motor frame 114 is disposed on the east-west driving mechanism 11. The east-west motor frame 114 includes an east-west reduced direct-current (DC) motor 115. The east-west gear 113 is connected with the axle center of the east-west geared DC motor 115. The east-west geared DC motor 115 controls the rotation of the east-west driving rods 111 and the east-west driving-mechanism platform 112. The south-north driving mechanism 12 is disposed on both sides of the east-west driving-mechanism platform 112. Two or more south-north driving rods 121 and the light concentrator 3 pass through the south-north driving mechanism 12. The two south-north driving rods 121 are connected correspondingly between the south-north driving mechanism 12 and the light concentrator 3. One of the south-north driving rods 121 is combined and moved linkedly with a south-north gear 122. In addition, a south-north motor frame 123 is disposed on the south-north driving mechanism 12. The south-north motor frame 123 includes a south-north geared DC motor 124. The south-north gear 122 is connected with the axle center of the south-north geared DC motor 124. The south-north geared DC motor 124 controls the rotation of the south-north driving rods 121 and the light concentrator 3 for guiding the sunlight into the light concentrator 3. In other words, according to this preferred embodiment of the present invention, by connecting the east-west gear 113 with the axle center of the east-west geared DC motor 115, the south-north gear 122 with the axle center of the south-north geared DC motor 124, and the east-west and the south-north geared DC motors 115, 124 with the sun-tracking controller 2, the sun-tracking controller 2 can control the actions of the sun-tracking and light-guiding member 1.

Figure 3:
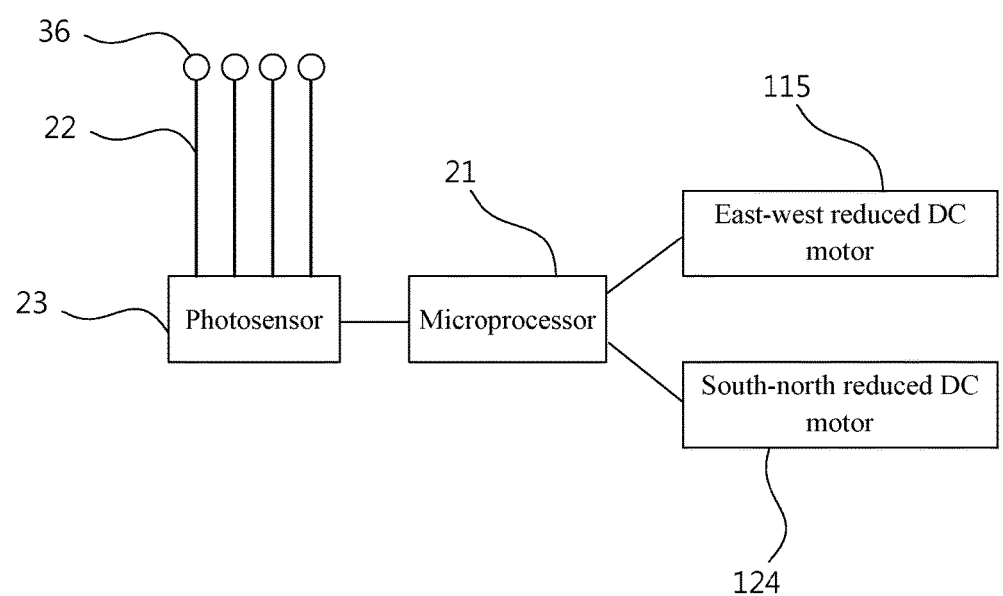
FIG. 3 shows a schematic diagram of the connection between the sun-tracking controller and the sun-tracking and light-guiding member according to a preferred embodiment of the present invention.

Please refer to FIG. 3, which shows a schematic diagram of the connection between the sun-tracking controller and the sun-tracking and light-guiding member according to a preferred embodiment of the present invention. As shown in the figure, the sun-tracking controller 2 adopts a microprocessor 21 as the core. The light-sensing optical fibers 22 guide the sunlight to the photosensors on the control circuit board. The photosensors 23 combine with the control circuit board (not shown in the figure) of the sun-tracking controller 2, and hence enabling the advantages of high integration and ease of maintenance. Moreover, according to a preferred embodiment of the present invention, the light concentrator 3 includes four light-testing optical-fiber connectors 36, which are connected with the plurality of light-sensing optical fibers 22. Two of the light-testing optical-fiber connectors 36 are disposed below the light concentrator 3 and used for detecting the location of the sun in the east and west direction. After the location of the sun is detected, the microprocessor 21 determines either to turn east or west by comparing the sensed values of the location of the sun in the east and west direction. Then the microprocessor 21 drives the east-west geared DC motor 115 through an H-bridge driving circuit. Likewise, after the location of the sun in the south and north direction is detected, the microprocessor 21 determines either to turn south or north by comparing the sensed values of the location of the sun in the south and north direction. Then the microprocessor 21 drives the south-north geared DC motor 124 through an H-bridge driving circuit. Thereby, the sun-tracking and light-guiding member 1 can always aim at the sun. The other two light-testing optical-fiber connectors 36 can prevent detection dead spots in the east and west direction.

Figure 4:
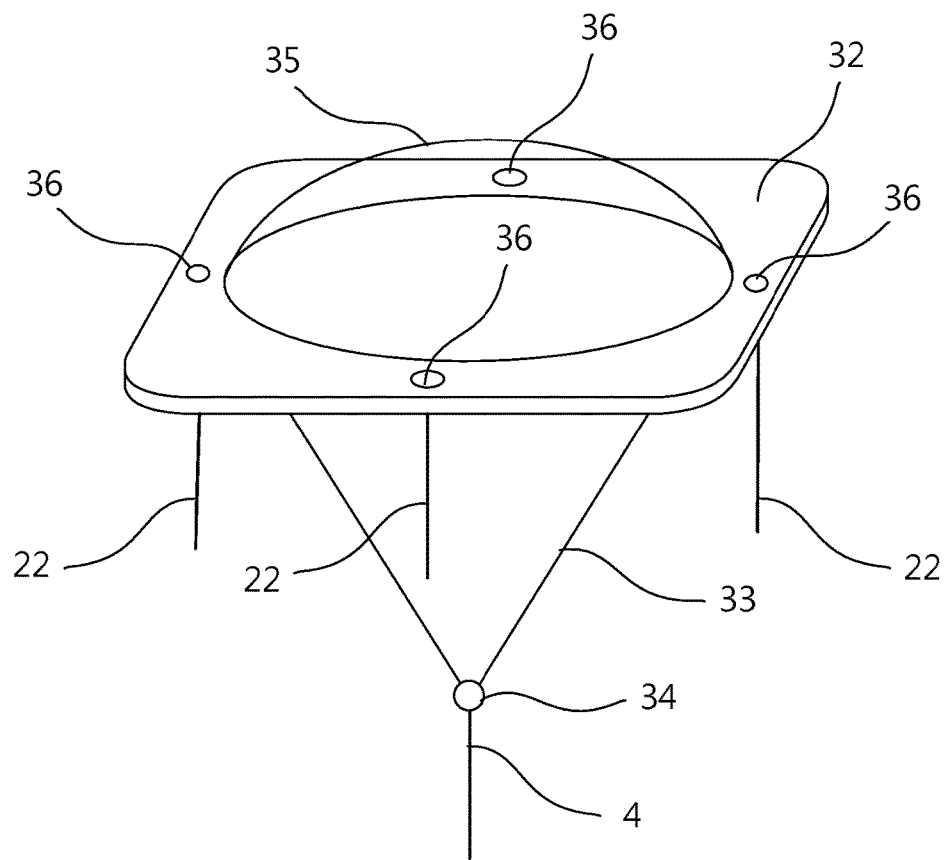
FIG. 4 shows a partial structural schematic diagram of the light concentrator according to a preferred embodiment of the present invention.

Please refer to FIG. 4, which shows a partial structural schematic diagram of the light concentrator according to a preferred embodiment of the present invention. As shown in the figure, the light concentrator 3 includes a light-concentrating lens 35, a light-guiding optical-fiber connector 34, and the light-testing optical-fiber connectors 36. A reflective cone 33 is above the light-guiding optical-fiber connector 34. If the sunlight is shifted, it is guided into the light-guiding optical fiber 4. A circular recess is located above the center of a light-concentrating base 32 for accommodating the light-concentrating lens 35. A filtering film pervious to light is disposed on the top surface of the light-concentrating lens 35 and used for filtering and allowing the visible light with wavelengths between 400 and 750 nm to pass through. The light-concentrating geometric multiplication of the light-concentrating lens 35 is below 50. A driving-axle hole (not shown in the figure) is included on the side of the light-concentrating base 32 for allowing the light-guiding optical fiber 4 to pass through. When multiple lenses and the corresponding multi-thread light-guiding optical fiber 4 are adopted, the multi-thread light-guiding optical fiber 4 is disposed through the driving-axle hole, which prevents it from wear during rotations. In addition, the installation will not be limited by the space. Thereby, the light-guiding performance will be excellent.

The light-guiding optical fiber 4 is used for guiding the sunlight for lighting. It is different from the light-sensing optical fibers 22 of the sun-tracking controller 2. The light-guiding optical fiber 4 includes mainly a plastic optical fiber. The light-guiding efficiency must be less than 30% loss for 10 meters.

Figure 5:
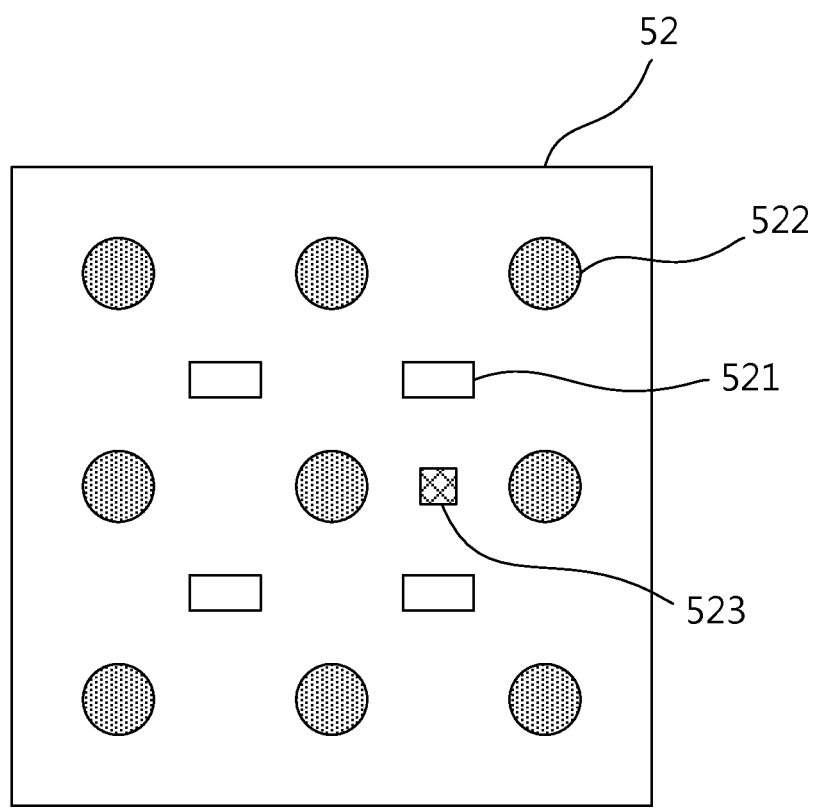
FIG. 5 shows a structural schematic diagram of the light-emitting plate of the switchable light emitter according to a preferred embodiment of the present invention.

The switchable light emitter 5 includes a light controller and a light-emitting plate. The light controller includes photosensors, a control circuit, and an LED driving circuit. The photosensors are disposed on the control circuit board of the light controller and connected using the light-sensing optical fibers 22 for sensing the intensity of the emitted light. The signals generated by the photosensors enter an analog-to-digital converter. Then the control circuit will calculate the illumination. Please refer to FIG. 5, which shows a structural schematic diagram of the light-emitting plate of the switchable light emitter according to a preferred embodiment of the present invention. As shown in the figure, the light-emitting plate 52 includes LEDs 521, light-guiding optical-fiber holes 522, and a light-testing optical-fiber hole 523 for controlling the switching between the sunlight and the LED light. When the sunlight is available, use the sunlight. If not, the LED light will be selected automatically. Through the switchable light emitter 5, uniform lighting is achieved indoors or for plant chambers.

To sum up, the flat wall-mounted sun-tracking and light-guiding device with built-in sensors disclosed in the present invention is a thin and light sun tracker and light guider. It is easily installed on the outer walls or roofs of buildings. In addition, the light concentrating is refraction-typed. The light-guiding optical fiber is wired axially. Thereby, the light-guiding optical fiber of the light concentrator will not be influenced by the rotation of the sun-tracking axle. Besides, distributed solar location sensors are adopted. The mechanism for the location of the sun and the optoelectronic sensors are separated. The location of the sun is determined by sensing the light intensities at four positions. The sensors are combined with the control circuit board, enabling the advantages of conveniences in fabrication and maintenance. Furthermore, the switchable light emitter is adopted for controlling the switching between the sunlight and the LED light. Based on the above benefits and efficacies, the flat wall-mounted sun-tracking and light-guiding device with built-in sensors according to the present invention is truly endowed with practical and economic values.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A wall-mounted sun tracking and light guiding apparatus, comprising:
   a sun-tracking controller;
   a sun-tracking and light-guiding member, coupled to said sun-tracking controller, including an east-west driving mechanism and a south-north driving mechanism, said east-west driving mechanism disposed on a base, said south-north driving mechanism disposed on said east-west driving mechanism, and said sun-tracking controller controlling the driving of said east-west driving mechanism and said south-north driving mechanism;
   a light concentrator, connected with said south-north driving mechanism, and including a light-guiding optical fiber and a plurality of light-sensing optical fibers; and
   a switchable light emitter, including a light-emitting plate and a plurality of photosensors, said light-emitting plate connected with one end of said light-guiding optical fiber, and said plurality of photosensors connected with one of end of said plurality of light-sensing optical fibers.

2. The wall-mounted sun tracking and light guiding apparatus of claim 1, wherein said sun-tracking controller includes one or more microprocessor.

3. The wall-mounted sun tracking and light guiding apparatus of claim 1, wherein two or more east-west driving rods and an east-west driving-mechanism platform pass through said east-west driving mechanism.

4. The wall-mounted sun tracking and light guiding apparatus of claim 3, wherein said two east-west driving rods are connected between said east-west driving mechanism and said east-west driving-mechanism platform, and one of said two east-west driving rods is combined and moved linkedly with an east-west gear.

5. The wall-mounted sun tracking and light guiding apparatus of claim 4, wherein said east-west driving mechanism includes an east-west motor frame; said east-west motor frame includes an east-west geared DC motor; and said east-west gear is connected with an axle center of said east-west geared DC motor.

6. The wall-mounted sun tracking and light guiding apparatus of claim 1, wherein two or more south-north driving rods and said light concentrator pass through said south-north driving mechanism.

7. The wall-mounted sun tracking and light guiding apparatus of claim 6, wherein said two south-north driving rods are connected between said south-north driving mechanism and said light concentrator, and one of said two south-north driving rods is combined and moved linkedly with a south-north gear.

8. The wall-mounted sun tracking and light guiding apparatus of claim 7, wherein said south-north driving mechanism includes a south-north motor frame; said south-north motor frame includes a south-north geared DC motor; and said south-north gear is connected with an axle center of said south-north geared DC motor.

9. The wall-mounted sun tracking and light guiding apparatus of claim 1, wherein said light concentrator includes four light-testing optical-fiber connectors connected with said plurality of light-sensing optical fibers.

10. The wall-mounted sun tracking and light guiding apparatus of claim 1, wherein said light concentrator further includes a light-concentrating lens having a filtering film on one surface for filtering and allowing the visible light with wavelengths between 400 and 750 nanometers to pass through.

* * * * *